United States Patent
LeCrone et al.

(10) Patent No.: US 7,516,168 B2
(45) Date of Patent: *Apr. 7, 2009

(54) PROGRAM FOR MONITORING UPDATE ACTIVITY IN A DATA STORAGE FACILITY

(75) Inventors: Douglas E. LeCrone, Hopkinton, MA (US); Daniel A. Murphy, Hopkinton, MA (US); Denis Hall, Chelmsford, MA (US)

(73) Assignee: EMC Corporation, Hopkinton, MA (US)

( * ) Notice: Subject to any disclaimer, the term of this patent is extended or adjusted under 35 U.S.C. 154(b) by 714 days.

This patent is subject to a terminal disclaimer.

(21) Appl. No.: 10/692,285

(22) Filed: Oct. 23, 2003

(65) Prior Publication Data

US 2004/0128326 A1 Jul. 1, 2004

Related U.S. Application Data

(63) Continuation of application No. 09/344,999, filed on Jun. 25, 1999, now Pat. No. 6,662,197.

(51) Int. Cl.
*G06F 17/30* (2006.01)

(52) U.S. Cl. .............. 707/204; 707/201; 707/202; 707/203; 711/130; 711/161; 711/162

(58) Field of Classification Search .............. 711/162, 711/130, 161; 714/6
See application file for complete search history.

(56) References Cited

U.S. PATENT DOCUMENTS

| | | | |
|---|---|---|---|
| 4,686,620 A | 8/1987 | Ng | |
| 5,210,866 A | 5/1993 | Milligan et al. | |
| 5,402,428 A | 3/1995 | Kakuta et al. | |
| 5,522,037 A | 5/1996 | Kitagawa et al. | |
| 5,559,991 A | 9/1996 | Kanfi | |
| 5,634,052 A | 5/1997 | Morris | |
| 5,649,089 A | 7/1997 | Kilner | |
| 5,742,792 A * | 4/1998 | Yanai et al. | 711/162 |
| 5,889,935 A * | 3/1999 | Ofek et al. | 714/6 |
| 6,052,797 A * | 4/2000 | Ofek et al. | 714/6 |
| 6,085,298 A * | 7/2000 | Ohran | 711/162 |
| 6,141,773 A | 10/2000 | St. Pierre et al. | |
| 6,173,377 B1 * | 1/2001 | Yanai et al. | 711/162 |
| 6,209,002 B1 | 3/2001 | Gagne et al. | |
| 6,324,654 B1 * | 11/2001 | Wahl et al. | 714/6 |
| 6,397,229 B1 | 5/2002 | Menon et al. | |
| 6,397,307 B2 * | 5/2002 | Ohran | 711/161 |
| 6,442,706 B1 | 8/2002 | Wahl et al. | |
| 2001/0002480 A1 * | 5/2001 | Dekoning et al. | 711/130 |
| 2001/0052058 A1 * | 12/2001 | Ohran | 711/161 |

* cited by examiner

*Primary Examiner*—Khanh B Pham
(74) *Attorney, Agent, or Firm*—George A. Herbster (57) ABSTRACT

A method and apparatus for monitoring update activity, particularly in the form of write requests, to a data storage facility, over at least one cycle to identify any write operation or update that occurs to that data storage facility on a track-by-track basis. At the end of each cycle a list of changed tracks is stored in a data set. After information has been accumulated by a collector application, a reporter application manipulates the data to obtain information concerning the track changes and to estimate communication path requirements.

41 Claims, 7 Drawing Sheets

FROM: 05/07/1999  11:05  TO: 05/07/1999  11:15

⤴ 200

| SYMMETRIX SERIAL # | VOLUME COUNT | TOTAL CYLINDERS | TRACKS CHANGED | CHG PER CYCLE | %TRKS CHNGD | RA'S | BNDWTH (KBS) | SYNC TIME |
|---|---|---|---|---|---|---|---|---|
| 000183600124 | 12 | 13356 | 71062 | 7118 | 35 | 1 | 500 | 02:12 |

203 ↗  204 ↗  205 ↗  206 ↗  207 ↗  210 ↗  211 ↗  212 ↗  213 ↗

THERE ARE 10 CYCLES INCLUDED IN THIS REPORT

FROM: 05/07/1999  11:05   TO:  05/07/1999  11:15 ⟵ 220

| SYMMETRIX SERIAL # | VOLSER | TOTAL EMUL | TRACKS CYLS | DSN'S CHNGD | TRACKS CHANGED | %TRKS CHNGD | CHG PER CYCLE |
|---|---|---|---|---|---|---|---|
| 000183600124 | SYB096 | 3390 | 1113 | 6 | 6541 | 39 | 595 |
|  | SYB097 | 3390 | 1113 | 13 | 6061 | 36 | 551 |
|  | SYB098 | 3390 | 1113 | 9 | 4217 | 25 | 384 |
|  | SYB099 | 3390 | 1113 | 14 | 7622 | 45 | 694 |
|  | SYB100 | 3390 | 1113 | 13 | 6782 | 40 | 617 |
|  | SYB101 | 3390 | 1113 | 6 | 3257 | 19 | 296 |
|  | SYB102 | 3390 | 1113 | 15 | 7472 | 44 | 680 |
|  | SYB103 | 3390 | 1113 | 14 | 6737 | 40 | 613 |
|  | SYB104 | 3390 | 1113 | 10 | 4697 | 28 | 427 |
|  | SYB105 | 3390 | 1113 | 13 | 6392 | 38 | 582 |
|  | SYB106 | 3390 | 1113 | 10 | 5132 | 30 | 467 |
|  | SYB107 | 3390 | 1113 | 10 | 6152 | 36 | 616 |

THERE ARE 10 CYCLES INCLUDED IN THIS REPORT ⟵ 221

FIG. 6

05/07/1999   D A T A S E T   S U M M A R Y (SYB096)   11:21:50  ← 233
FROM:   05/07/1999   11:05   TO:   05/07/1999   11:15  ← 232

| DATASET NAME | CREATE DATE | CYLS | EXTS | TRACKS CHANGED | %TRKS CHNGD |
|---|---|---|---|---|---|
| FORMAT.VSYB096 | 05/06/1999 | 15 | 1 | 0 | 0 |
| FORMAT.VSYB096.SB26X0A | 05/07/1999 | 30 | 1 | 0 | 0 |
| FORMAT.VSYB096.SB26X0B | 05/07/1999 | 46 | 1 | 0 | 0 |
| FORMAT.VSYB096.SB26X0C | 05/07/1999 | 22 | 1 | 0 | 0 |
| FORMAT.VSYB096.SB26X0D | 05/07/1999 | 11 | 1 | 0 | 0 |
| FORMAT.VSYB096.SB26X0E | 05/07/1999 | 26 | 1 | 0 | 0 |
| FORMAT.VSYB096.SB26X0F | 05/07/1999 | 13 | 1 | 0 | 0 |
| FORMAT.VSYB096.SB26X01 | 05/07/1999 | 99 | 1 | 1485 | 100 |
| FORMAT.VSYB096.SB26X02 | 05/07/1999 | 98 | 1 | 1470 | 100 |
| FORMAT.VSYB096.SB26X03 | 05/07/1999 | 96 | 1 | 1440 | 100 |
| FORMAT.VSYB096.SB26X04 | 05/07/1999 | 27 | 1 | 405 | 100 |
| FORMAT.VSYB096.SB26X07 | 05/07/1999 | 77 | 1 | 1155 | 100 |
| FORMAT.VSYB096.SB26X08 | 05/07/1999 | 39 | 1 | 585 | 100 |
| FORMAT.VSYB096.SB26X09 | 05/07/1999 | 79 | 1 | 0 | 0 |
| FORMAT.VSYB096.SB26X10 | 05/07/1999 | 26 | 1 | 0 | 0 |
| FORMAT.VSYB096.SB26X11 | 05/07/1999 | 43 | 1 | 0 | 0 |
| FORMAT.VSYB096.SB26X12 | 05/07/1999 | 20 | 1 | 0 | 0 |
| FORMAT.VSYB096.SB26X13 | 05/07/1999 | 36 | 1 | 0 | 0 |
| FORMAT.VSYB096.SB26X14 | 05/07/1999 | 16 | 1 | 0 | 0 |
| FORMAT.VSYB096.SB26X15 | 05/07/1999 | 22 | 1 | 0 | 0 |
| FORMAT.VSYB096.SB26X16 | 05/07/1999 | 31 | 1 | 0 | 0 |
| FORMAT.VSYB096.SB26X17 | 05/07/1999 | 18 | 1 | 0 | 0 |
| FORMAT.VSYB096.SB26X18 | 05/07/1999 | 55 | 1 | 0 | 0 |
| FORMAT.VSYB096.SB26X19 | 05/07/1999 | 17 | 1 | 0 | 0 |
| SYS1.VTOCIX.SYB096 | 04/29/1999 | 10 | 1 | 0 | 0 |

05/07/1999   D A T A S E T   S U M M A R Y (SYB097)   11:21:50
FROM:   05/07/1999   11:05   TO:   05/07/1999   11:15

| DATASET NAME | CREATE DATE | CYLS | EXTS | TRACKS CHANGED | %TRKS CHNGD |
|---|---|---|---|---|---|
| FORMAT.VSYB097 | 05/03/1999 | 350 | 1 | 0 | 0 |
| FORMAT.VSYB097.SB26X0B | 05/07/1999 | 13 | 1 | 195 | 100 |
| FORMAT.VSYB097.SB26X0C | 05/07/1999 | 10 | 1 | 150 | 100 |
| FORMAT.VSYB097.SB26X0D | 05/07/1999 | 25 | 1 | 375 | 100 |
| FORMAT.VSYB097.SB26X0E | 05/07/1999 | 11 | 1 | 165 | 100 |
| FORMAT.VSYB097.SB26X01 | 05/07/1999 | 21 | 1 | 315 | 100 |
| FORMAT.VSYB097.SB26X02 | 05/07/1999 | 19 | 1 | 285 | 100 |
| FORMAT.VSYB097.SB26X03 | 05/07/1999 | 57 | 1 | 855 | 100 |

FIG. 7

PROGRAM FOR MONITORING UPDATE ACTIVITY IN A DATA STORAGE FACILITY

CROSS REFERENCE TO RELATED APPLICATIONS

This application is a continuation of U.S. patent application Ser. No. 09/344,999 filed Jun. 25, 1999 now U.S. Pat. No. 6,662,197 entitled Method and Apparatus for Monitoring Update Activity in a Data Storage Facility.

U.S. Pat. No. 6,101,497 (2000) by Ofek for a METHOD AND APPARATUS FOR INDEPENDENT AND SIMULTANEOUS ACCESS TO A COMMON DATA SET that is assigned to the assignee of the present application and that is incorporated herein by reference.

U.S. Pat. No. 6,209,002 (2001) by Gagne et al. for a METHOD AND APPARATUS FOR CASCADING DATA THROUGH REDUNDANT DATA STORAGE UNITS is assigned to the assignee of the present application and is incorporated herein by reference.

BACKGROUND OF THE INVENTION

1. Field of the Invention

This application generally relates to data storage facilities used in data processing networks and more specifically to the analysis of operations of multiple redundant data storage facilities interconnected by a communications path.

2. Description of Related Art

The above-referenced U.S. Pat. No. 6,209,002 discloses a data storage facility for transferring data from a data altering apparatus, such as a production data processing site to a remote data receiving site. The data storage facility includes a first data store for recording each change in the data generated by the data altering apparatus. A register set records each change on a track-by-track basis. A second data store has first and second operating modes. During a first operating mode the second data store becomes a mirror of the first data store. During a second operating mode the second data store ceases to act as a mirror and becomes a source for a transfer of data to the remote data receiving site. Only information that has been altered, i.e., specific tracks that have been altered, are transferred during successive operations in the second operating mode. Commands from the local production site initiate the transfers between the first and second operating modes.

One of the advantages of the foregoing system relates to the required characteristics or a communications path between the remote site and the data receiving site. That is, it is expected that the required bandwidth of that communications path will be significantly less than the required bandwidth of the communications path between the local production site and an intermediate remote storage location. As will be apparent, if the bandwidth of this communications path decreases, the costs for the communications path will also decrease. However, the ultimate decrease will be dependent upon the time that can be allocated to the receipt of all changes at the remote data receiving site. Consequently it is desirable to provide some method of estimating, with some accuracy, the bandwidth requirements required for enabling all updates to transfer to the data receiving site within acceptable times. Conversely, it is desirable to provide some method of estimating the time required to transfer all updates to the data receiving site given an available bandwidth of the communications path. If such information is available, then it is possible to tailor the communications path to provide the desired performance at the least cost.

Stated differently, assume that a customer wishes to add the cascading feature described in the above-identified U.S. Pat. No. 6,209,002. It would be helpful to predict the communications path requirement in advance of installing the cascading feature to avoid overly long updating because the bandwidth is too low or to avoid extra charges because the bandwidth is too high.

It might seem that one of several utilities available in data processing networks might provide the information from which the performance/bandwidth could be predicted. For example, the MVS operating system includes a utility that records each I/O operation. However, that information does not distinguish read and write operations and does not provide any information with respect to logical volumes involved in any I/O requests. Symmetrix data storage facilities provided by the assignee of this invention can monitor read and write requests at a logical volume level, but they also do not provide sufficient information. Consequently, what is needed is a method and apparatus for enabling a system engineer or customer to predict, with reasonable accuracy, the rate at which data will transfer between a remote site and a data receiving site.

SUMMARY

Therefore, it is an object of this invention to enable the prediction of update activity across a communications path from a disk storage facility.

Another object of this invention is to enable the prediction of update activity across a communications path between redundant disk storage facilities.

Yet another object of this invention is to enable the prediction of bandwidth requirements to achieve an updated copy in a redundant disk storage facility within a predetermined time.

Still another object of this invention is to enable the prediction of the time required to achieve an updated copy in a redundant disk storage facility with a communications path having a predetermined bandwidth.

Yet still another object of this invention is to provide statistics for predicting or evaluating performance in a redundant data storage facility concurrently with normally data processing operations.

This invention enables update information to be obtained for a disk storage facility which stores data groups as a plurality of data blocks by initially defining a data group set of at least one data group and an interval during information about updates is to be accumulated. The information is obtained by recording, during the defined interval, a first update to each data block in the data group set. After the defined interval, the recorded information is manipulated to obtain the total number of data blocks in the data group set that were updated at least one time during the defined interval.

In accordance with another aspect of this invention, information about update operations between first and second remote data storage facilities over a communications path is obtained from a local site. Each of the data storage facilities stores data in data sets on disk tracks, so initially a set of disk tracks in the local data storage facility is defined along with a time interval. At the end of the time interval, an identification of each track in the local data storage facility that is updated during the interval is recorded. After the completion of the time interval, the number of tracks in the defined set of disk tracks that were updated during the time interval is determined.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 7 depicts a third example of information provided by the collection and report processes.

DESCRIPTION OF ILLUSTRATIVE EMBODIMENTS

General Operation

Figure 1:
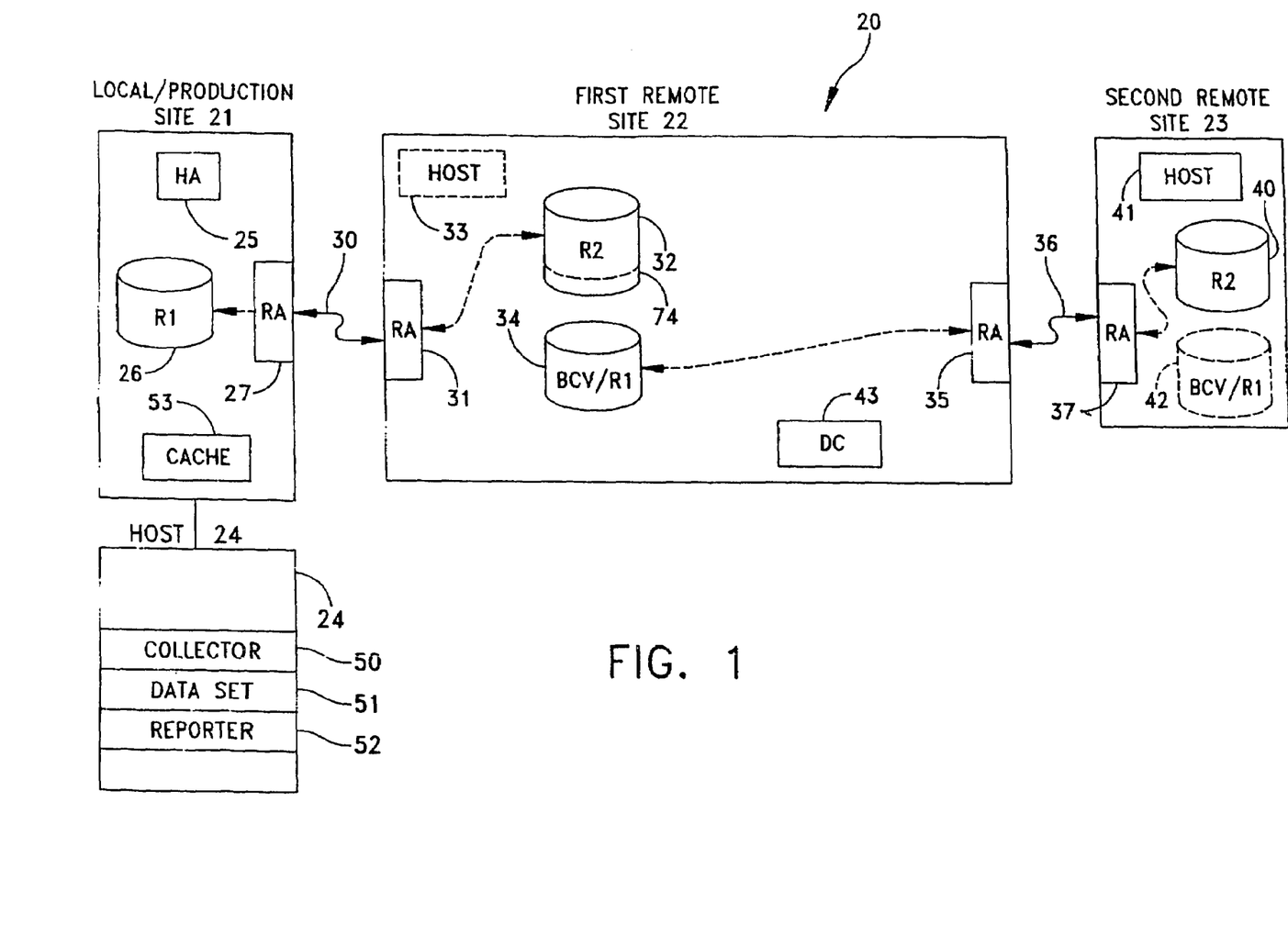
FIG. 1 is a block diagram of a data processing network including a production facility and two geographically remote facilities.

FIG. 1 depicts a data processing network 20 with equipment located at a local or production site 21, a first remote site 22 and a second remote site 23. The first and second remote sites 22 and 23 typically will be geographically remote from the local production site 21 and from each other. Alternatively, the equipment at the local production site 21 and first remote site 22 could be collocated.

A first level of redundancy is achieved in the data processing network 20 of FIG. 1 through interactions between the local production site 21 and the first remote site 22. As known, a host 24, that includes one or more central processors and a main memory, operates on various programs or applications. Periodically the host 24 will effect a transfer through a host adapter 25 to a disk storage device. This disk storage device may have many physical disk drives organized into discrete sections for storing related information. These include files or other data blocks. In the context of the equipment manufactured by the assignee of this invention, a typical storage section is a logical volume comprising a number of contiguous disk tracks. Transfers are made on a track-by-track basis. In FIG. 1 an R1 logical volume 26 is representative of the many logical volumes that normally are included in such a disk storage facility. As will also be apparent the host 24 retrieves any information it needs from such a production storage facility through the host adapter 25. Such systems are well known in the art.

Although not shown, the local production site 21 may provide redundancy for the R1 logical volume 26. For example, the R1 volume may actually be mirrored or constituted by an array of logical volumes in any one of various RAID configurations thereby to prevent failure of a particular physical disk drive from interrupting operations by the host 24.

U.S. Pat. No. 5,544,347 to Yanai et al., assigned to the same assignee of this invention, discloses another redundancy scheme that can be implemented by mirroring the data in the R1 logical volume 26 at the first remote site 22. More specifically in this configuration the local production site 21 includes a remote adapter (RA) 27 that connects through a high speed communications link, such as an ESCON or T3 communications line, to a corresponding remote adapter 31 in the first remote site 22. Each time the host 24 writes data to the R1 logical volume 26, the remote adapter 27 responds by transferring that update through the high speed communications link to the remote adapter 31 in the first remote storage site 22 for transfer to an R2 logical volume 32. Thus each WRITE operation is reflected or conveyed to the R2 logical volume 32 that acts as a remote mirror with respect to the R1 logical volume 26. If a natural disaster strikes the local production site 21, the data is readily available in the R2 logical volume at the remote site. Moreover if a host 33 is located in the first remote site 22, it is possible for all operations to shift to the first remote site for continued operation without any undetected data losses.

The above-identified U.S. Pat. No. 6,101,497 discloses a data processing network that includes a BCV logical volume associated with a data storage facility. Such a BCV/R1 logical volume 34 is included in the first remote site 22. It can comprise any dedicated logical volume within the first remote site 22 preferably on a physical disk drive that is different from the physical disk drive that contains the R2 logical volume 32. This BCV/R1 logical volume 34 can be connected either to the R2 logical volume 32 or to a remote adapter 35. In a first operating mode, the BCV logical volume 34 synchronizes with the R2 logical volume 32. In a second operating mode with the BCV/R1 logical volume 34 attaches to the remote adapter 35 so data will transfer over another communications link 36 to a remote adapter 37 in the second remote site 23 for transfer to an R2 logical volume 40 or other data receiver.

In one embodiment to which this invention is particularly adapted, the second remote site 23 contains a host 41 and eliminates the need for the existence of the host 33 at the first remote site 22. Thus the second remote site 23 becomes the restoration site or secondary site for operating on the data if a natural disaster occurs at the local production site 21. The second remote site is also shown as containing an optional BCV/R1 logical volume 42. Including this logical volume at the second remote site 23 could allow a replication of the function performed in accordance with this invention to a third remote site.

In general terms, a remote site will have the basic structure of the first remote site 22 that constitutes a data storage facility. It includes a first data store in the form of the R2 logical volume 32 for connection to the local production site 21 that can alter data. The BCV/R1 logical volume 34 constitutes a second data store. In response to a first command, the data store facility in the first remote site 22 operates in a first operating mode during which the R2 logical volume 32 receives data from the remote adapter 31 and thereby is responsive to changes made to the data in the R1 logical volume 26. Typically this is accomplished synchronously so a high-speed communications link 30 is necessary. In this operating mode the BCV/R1 logical volume 34 is considered to be operating in its BCV or first operating mode as a mirror to the R2 logical volume 32.

The BCV/R1 logical volume 34 can shift to a second, or R1, operating mode once synchronism is achieved in the first operating mode. In the second operating mode the first remote site transfers data from the BCV/R1 logical volume 34 through the remote adapter 35, communications link 36 and remote adapter 37 connects to the R2 logical volume 40. The timing of shifts from the first to the second operating modes will be determined by a system operator. However, shifts from the second operating mode to the first operating mode will generally be made after the data transfer to the R2 logical volume 40 is complete. Typically the interval between shifts to the second operating mode will be in terms of minutes, hours or even days depending upon the activity in the R2 logical volume 32.

Each time the BCV/R1 logical volume 34 shifts to its second operating mode, only the data tracks that have been altered during the first operating mode are transferred to the R2 logical volume 40. If the local production site 21 makes repeated changes to a single track of the R2 logical volume 32 between successive shifts to the second operating mode, only one transfer will occur from the BCV/R1 logical volume 34 to the R2 logical volume 40. Such reductions lead to a reduction in the bandwidth requirements on the communications link 36. For example, it may be possible to reduce the communications link 36 to a level that will allow transfers over low bandwidth telephone lines or the Internet.

This invention allows those bandwidth requirements to be predicted with accuracy. Still referring to FIG. 1, the host 24 includes an application for predicting activity from the first remote site 22 to the second remote site 23 by monitoring the operations in the local production site 21. The information for this prediction is obtained by means of a collector application 50 that produces a data set 51. A reporter application 52 then manipulates the information in the data set 51 to generate a report that provides data in several forms based upon activity and bandwidth. Before describing the detailed operation of the collector application 50 and reporter application 52 with the data set 51, it will be helpful to an understanding of this invention to provide an outline of the organization of a cache 53 in the local production site 21.

Figure 2:
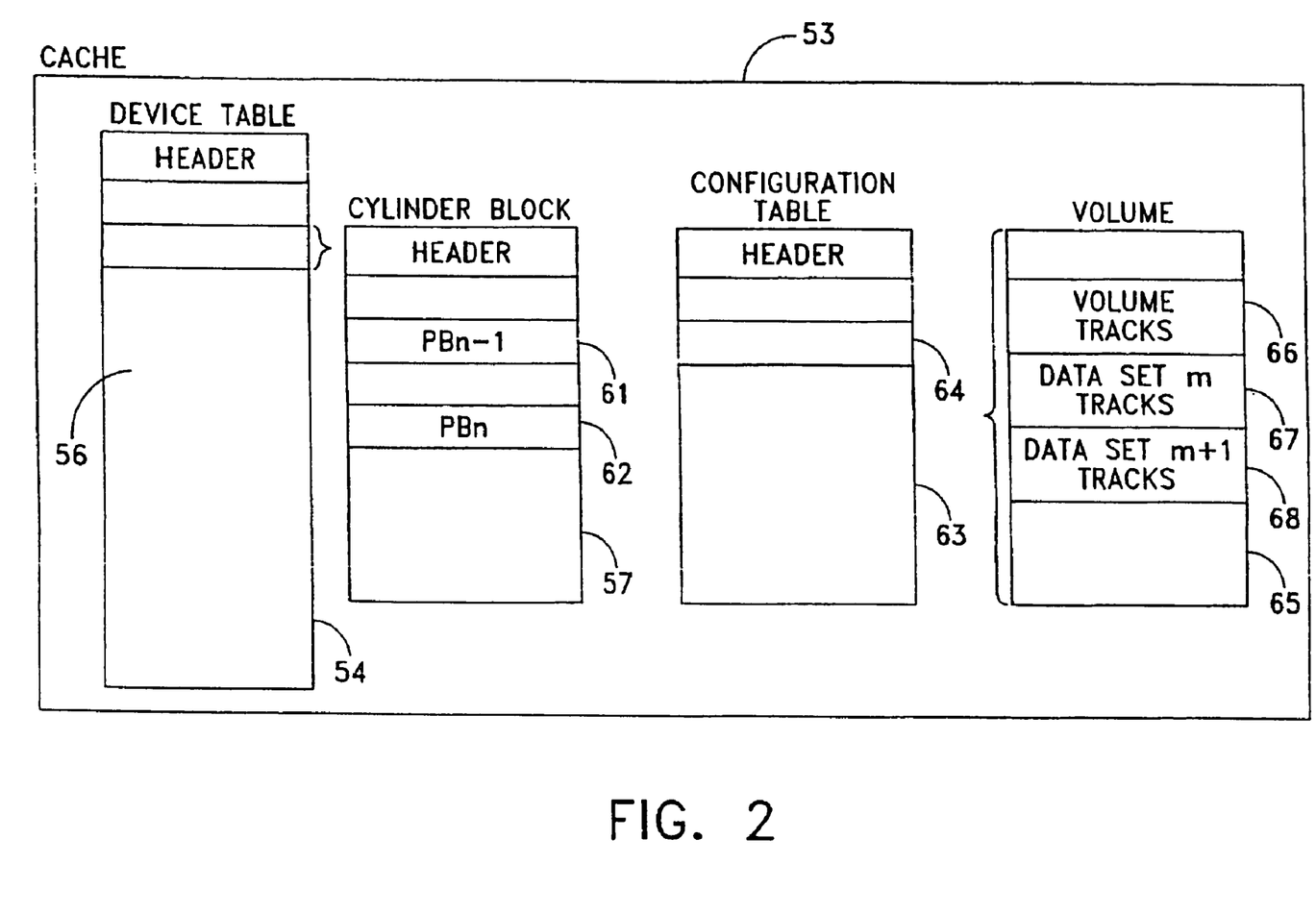
FIG. 2 is a diagram that illustrates certain contents of a cache memory used in the production facility of FIG. 1 in connection with this invention.

FIG. 2 depicts the cache 53 as including a device table 54 with a header section and a number of cylinder blocks 56. A single cylinder block 57 is shown in more detail as including a header, and, among other information, an array of sets of protection bits (PB) bits. Two sets $PB_{n-1}$ set 61 and a $PB_n$ set 62 are shown. Each set includes one entry for each cylinder in the logical volume or device; single bits in each set correspond to individual tracks within that cylinder and constitute flags that represent the status of individual data tracks. In a typical implementation, each PB cylinder entry comprises a sixteen-bit word for providing individual track information for each of fifteen tracks in the cylinder.

At the beginning of any application using the PB bits, each bit position or flag will be set to a first state, such as by clearing all the flags. Each time the system performs an update operation by generating a write request to a data track in a logical volume, the corresponding bit position or flag is altered to a second state, such as by setting the PB bit position in each PB set. Once a bit position is set, subsequent write operations to that track do not effect the corresponding bit. Thus each PB bit position, when set, indicates that a corresponding track has been written at least one time since the last time that the PB bit was cleared.

A configuration table 63 includes a header and volume blocks 64. One such volume block 65 is shown in detail. It includes a plurality of volume entries, a volume entry for one volume $VOL_i$ 66 being shown in detail. Each volume entry, such as $VOL_i$ entry 66, includes a listing of all data sets with an identification of the individual tracks assigned to in that data set. Entries 67 and 68 represent entries for two data sets designated Data $set_m$ and Data $set_{m+i}$. Thus the configuration table 63 provides for any data set or file a list of all tracks that contain that data set or file. With this granularity, it is also possible to combine or integrate the lists to identify all tracks that form a logical volume or device and that form a controller, such as the controller comprising the host adapter 25, R1 logical volume 26 and other volumes, the remote adapter 27 and the cache 53 shown in FIG. 1.

Figure 3:
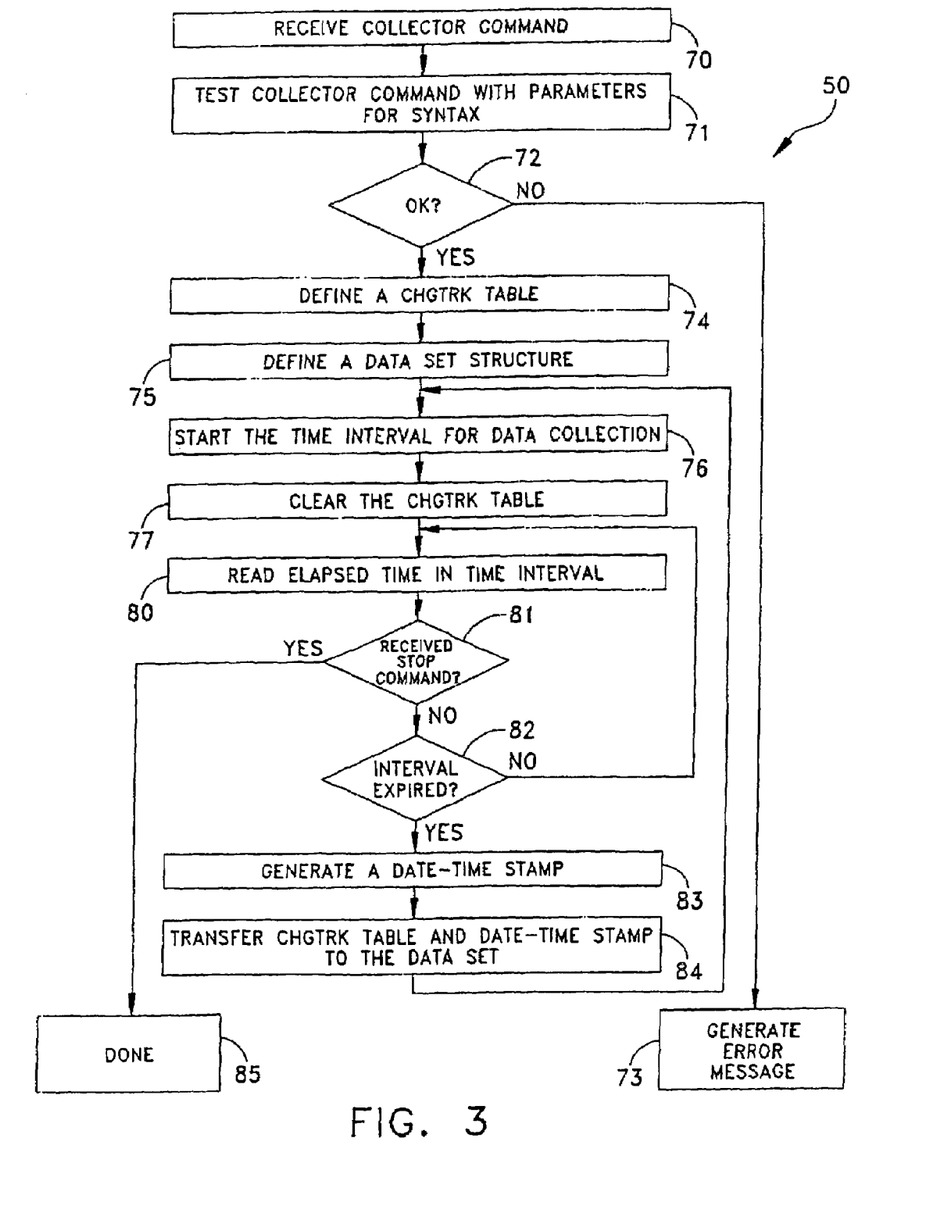
FIG. 3 depicts the operation of the network in FIG. 1 in response to a collection process used in this invention.

FIG. 3 depicts the operation of the collector application 50 that is initiated by a collector command that identifies the devices (e.g., logical volumes) to be monitored, a cycle time and an identification of a data set 51 shown in FIG. 1. For example, if the host 24 operates under the IBM® MVS operating system the following would constitute the contents of a command that defines a data group set of at least one data group:

DEVICE_LIST=100 –11F,8800–88F
DEVICE_LIST=PL01*,900,910
CYCLE=10
HLQ=TRVW
PALLOC=50
SALLOC=20
VOLSER=EMC200

The two lines specifying device lists constitute one approach for specifying the extent of the information to be accumulated. In this example, the identification is in the form of a device list that identifies specific logical volumes. The extent can also be defined by a named group of data sets or logical volumes, such as a SMS_GROUP designation or by listing one or more controllers using their respective serial numbers. The cycle time represents a defined interval over which data is to be accumulated or collected; in this specific example, the cycle time is set to 10 minutes. The remaining lines identify the location of the data set 51 as known in the art. When this particular command is processed, it begins an iterative process with each iteration occurring once per cycle. This process continues until a STOP command is generated. In an MVS operating system this can be either a STOP or MODIFY command as known in the art.

The collector application 50 in FIG. 3 begins when the collector command is received in step 70. Initially step 71 examines a collector command for syntax and other parameters as well known in the art. Although FIG. 3 depicts only one such error checking process, other error checking tests can be included throughout the process set forth in FIG. 3 with the generation of appropriate error messages. If the tests in step 71 are not passed, step 72 diverts control to step 73 to generate an error message.

Assuming that the collector command has correct syntax and parameters, step 74 defines a CHGTRK table. This is the procedure by which one of the PB sets, such as one of the sets 61 and 62 in FIG. 2, is selected. For purposes of explanation, the phrase "CHGTRK table" designates that specifically elected table. Step 75 then defines the structure of the data set 51 in accordance with the information in the command defining that data set structure.

Step 76 then begins an iterative sequence or loop that starts the time interval for data collection, which interval is set by the cycle time. Step 77 clears all the bit positions in the CHGTRK table in step 77 thereby resetting all the bits representing all the tracks within the defined list of devices. Steps 80 through 82 represent the timing loop that waits for the expiration of the cycle time or interval. Step 80 specifically reads the elapsed time for the particular cycle. Step 81 determines whether a stop command, such as the STOP or MODIFY command mentioned previously, has been received. If no such command has been received, step 82 tests to determine whether the time interval for the cycle has expired. If it has not, control transfers back to step 80 and the loop of steps of 80 through 82 continues. When the cycle time expires without the receipt of a STOP command, step 82 diverts control to step 83 that generates a date/time stamp and step 84 that transfers the entire CHGTRK table with the date/time stamp to the data set 51. Then control passes back to step 76 to restart the time interval. As successive time intervals expire, the transfer in step 84 appends additional date-time stamped copies of the CHGTRK table to the data set 51.

This process continues until a STOP command is received. Step 81 then transfers control to step 85 to complete the operation to include any additional procedures necessary to terminate the operation of the collector application in an orderly fashion. Such procedures are well known to those of ordinary skill in the art.

When the collector application 50 terminates, the data set 51 contains a series of entries or files. Each entry or file represents the CHGTRK table as it existed when its corresponding cycle, identified by its date-time stamp, terminated. Each bit position in the CHGTRK table indicates whether each track has been written one or more times. This information then provides the input for the reporter application 52 that operates as shown in FIG. 4.

Figure 4:
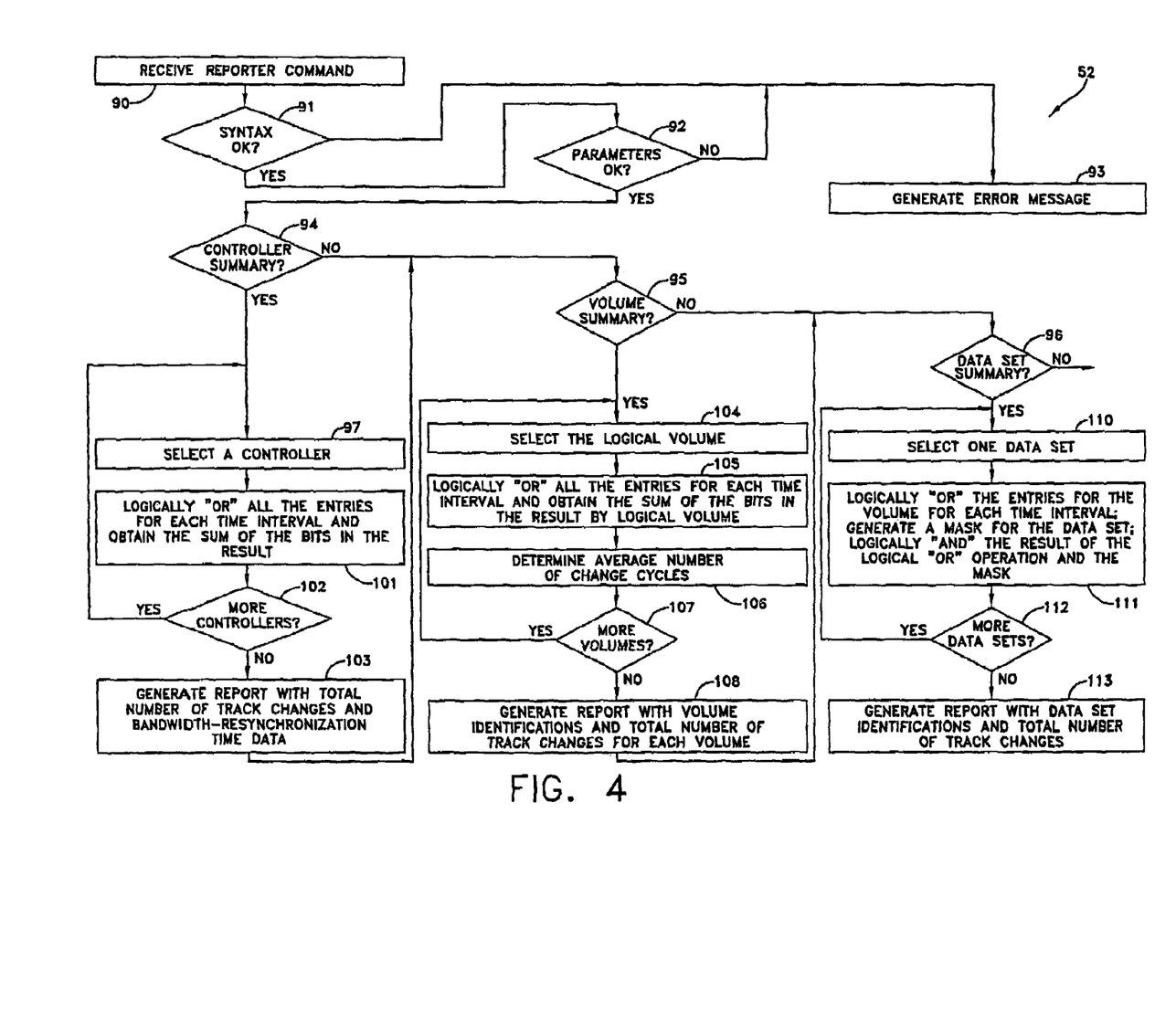
FIG. 4 depicts the operation of the network in FIG. 1 in response to a report process used in this invention.

In FIG. 4 step 90 represents the receipt of a start reporter command for initiating the reporter application 52. This command will contain three basic arguments or parameters. The first will be a definition of the devices for which the report is to be generated. This definition can have any of the forms as described with respect to the definitions for the collector application 50. The second will be the time frame over which the report is to be given. This will include both starting and ending date and time information and generally will include multiple cycle times. The third will specify a report type. For example, as described herein, the reporter application 50 can generate a controller summary report, a volume summary report or a data set summary report. If a controller type report is requested, the command will additionally include certain items pertaining to bandwidth and resynchronization time. In this specific embodiment three parameters are involved. The first is the bandwidth over a particular remote adapter, such as the communications link 36, connecting the remote adapters 35 and 37. The second parameter is the bandwidth of each communications path. The third is the time for resynchronization. The reporter command must contain two of these three parameters.

A typical command for initiating the report application could take the following form in an MVS environment:

DEVICE_LIST
REPORTS=
DATE=
TOD=
RACOUNT=
RA_KBS=
RESYNCH_TIME= where the command line "DEVICE_LIST identifies logical volumes by any of the same approaches defined with respect to the collector command. The "REPORTS" line identifies which of the controller, logical volume or data set summary reports is to be produced either individually or in combination with one or more of the other reports. The DATE and TIME arguments provide starting and ending dates and times, respectively, for a report time frame.

If the REPORTS argument specifies a controller summary report, the reporter command must also include two out of three of the RACOUNT, RA_KBS and RESYNCTIME arguments. The RACOUNT identifies the number of remote adapters assigned to the communications path, such as the path 36 in FIG. 1. The RA_KBS states the average bandwidth of each RA path in kilobytes per second. If multiple RA paths are available (i.e., RACOUNT>1), each path will typically have the same bandwidth. The RESYNCTIME argument is the time in minutes to achieve a transfer of all the changed tracks across the communications path 36.

In FIG. 4, when step 90 receives such a reporter command, step 91 tests the command syntax and step 92 tests the various parameters or arguments. If any errors exist, step 93 generates an appropriate error message. Assuming the reporter command has the correct syntax and construction, step 92 diverts control to step 94. Steps 94, 95 and 96 depict one alternate decoding sequence for determining the type of report to be produced. If a controller summary report is requested, control transfers to step 97. Otherwise control transfers to step 95 to test for a volume summary report request. If a volume summary report is not specified, step 96 tests for a data set summary report request. Step 96 then can have several functions depending upon the specific objectives and other capabilities of the reporter application. While step 96 shows only an affirmative output, a negative decoding result could transfer control to generate an error message. Alternatively, the transfer could be to additional decoding steps or to a default process.

Now referring to the receipt of a command for a controller summary report, step 94 transfers control to step 97 that selects a particular controller from the list of one or more controllers defined in the reporter command. Step 101 takes each of the CHGTRK tables for the selected controller from the data set 51 and combines into a final table each table by a logical OR operation for the time interval defined by the DATE and TOD arguments of the reporter command. For example if the report requests information over six cycles, then CHGTRK tables for each of those cycles will be retrieved and combined into a single or final table that represents the logical OR of all six tables in the data set 51 on a bit-by-bit basis. The total number of set bits positions, or flags, corresponds to the total number of tracks that were written during the report time frame. If the report time frame is selected to correspond to the interval over which the BCV/R1 device 34 in FIG. 1 during which data would be accumulated in a cascading operation, the number of bits or flags in the final table will represent the total number tracks that would have been changed and would be transferred over the communications path 36.

If additional controllers are to be analyzed, step 102 transfers control back to step 97 to select another controller and to produce another controller bit map. When all the controllers defined in the reported command have been analyzed, step 103 generates a report. Then control passes to step 95.

Figure 5:
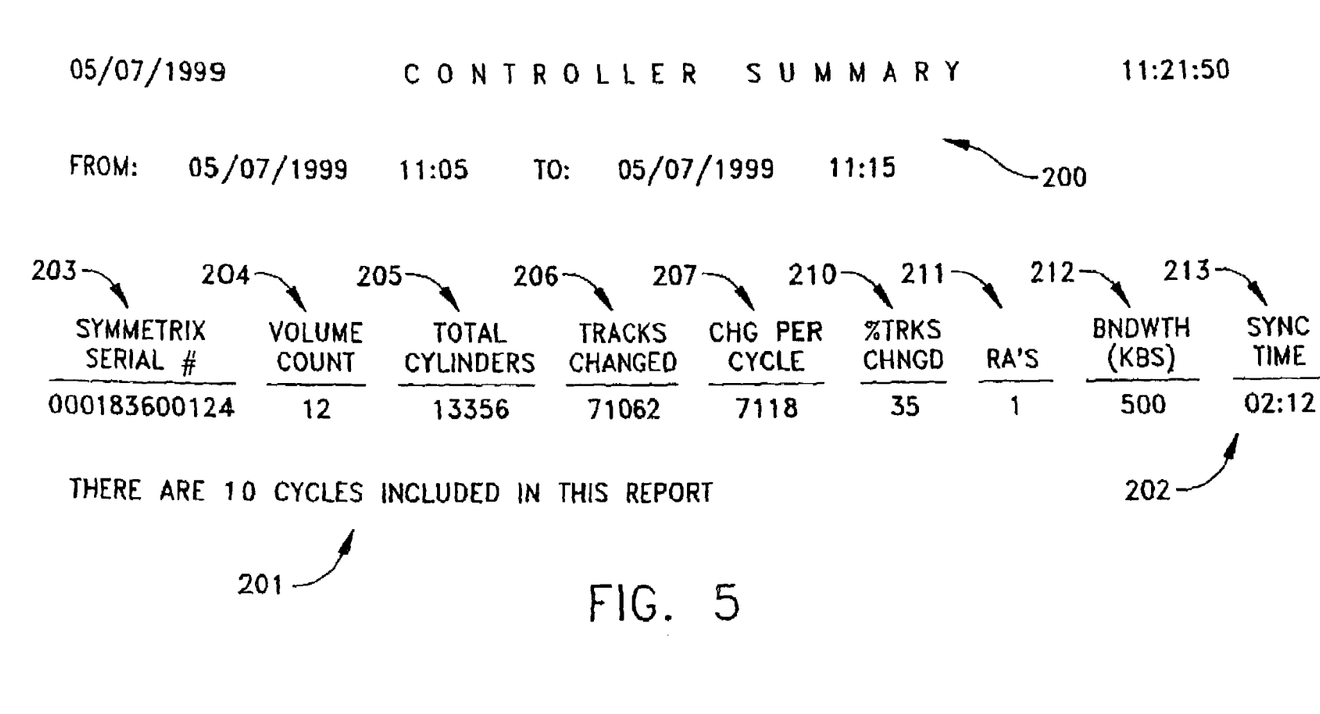
FIG. 5 depicts one example of information provided by the collection and report processes.

FIG. 5 depicts one form of that report. A header portion 200 identifies particular information concerning the starting and ending dates and times for the report time frame. A trailer 201 specifies the number of cycles that were processed. The report includes one line for each controller. In this specific report, there is one line 202 because only one controller was specified. The controller is identified by its serial number at column 203. The reporter application also obtains from the configuration tables 63 in FIG. 2 the number of logical volumes in each controller that are the subject of the report and the total number 205 of cylinders in each controller for further identification purposes. Columns 204 and 205 display this information. A tracks change column 206 identifies the total number of bits that were set in the resultant controller bit map vector. Column 207 defines the average of the number of changes recorded for each cycle in the interval; column 210, the percentage of tracks that were changed during the report interval.

Columns 211, 212 and 213 contain information related to the number of RAs, the bandwidth of each RA and the time for resynchronization. As previously indicated, the controller summary reporter command will include two of the three values.

The following equation establishes the relationship between these three values:

$$SYNC\text{-}TIME = \frac{TRACKS\text{-}CHANGED * TRACK\text{-}SIZE}{N_{RA} * BW_{RA} * 1024 * 60}$$

where TRACKS-CHANGED represents the total number of tracks changed, such as shown in column 206 in FIG. 5. TRACK-SIZE represents the number of bytes in a track, $N_{RA}$ is the number of remote adapters forming the communications path to be analyzed, such as the communications path 36 in FIG. 1, and $BW_{RA}$ represents the average bandwidth for the remote adapters in kilobytes per second. If two of the $N_{RA}$ AND $BW_{RA}$ parameters are given, the third, SYNC-TIME, can be determined. For example, if the values for $N_{RA}$ and $BW_{RA}$ are given, the above equation yields the SYNC-TIME value representing the time to transfer all the updates in minutes over a communication path with the provided bandwidth information.

Thus, this report enables the system operator at the local or production site 21 to determine properties of the operations between the first remote site 22 and second remote site 23 in FIG. 1 without having to obtain to obtain data from those sites. Moreover, the sites need not even exist to obtain a prediction of the requirements as during the processing of planning the addition of a data cascading feature to a data processing network.

Referring again to FIG. 4, if the reporter command defines a volume summary report, step 95 diverts control to step 104 that will select one logical volume from the device list included in the reporter command. Step 105 then combines all the volume bit maps for each cycle in the time interval in a logical OR operation by logical volume. Thus over the time duration of the report, that may include multiple cycles, step 105 produces for each logical volume the total number of tracks that were changed over the time of the report. Step 106 collects information on track changes per cycle of operation for the entire logical volume, determines the number of changes for each cycle and produces the average of that number for the total number of cycles covered by the report.

Figure 6:
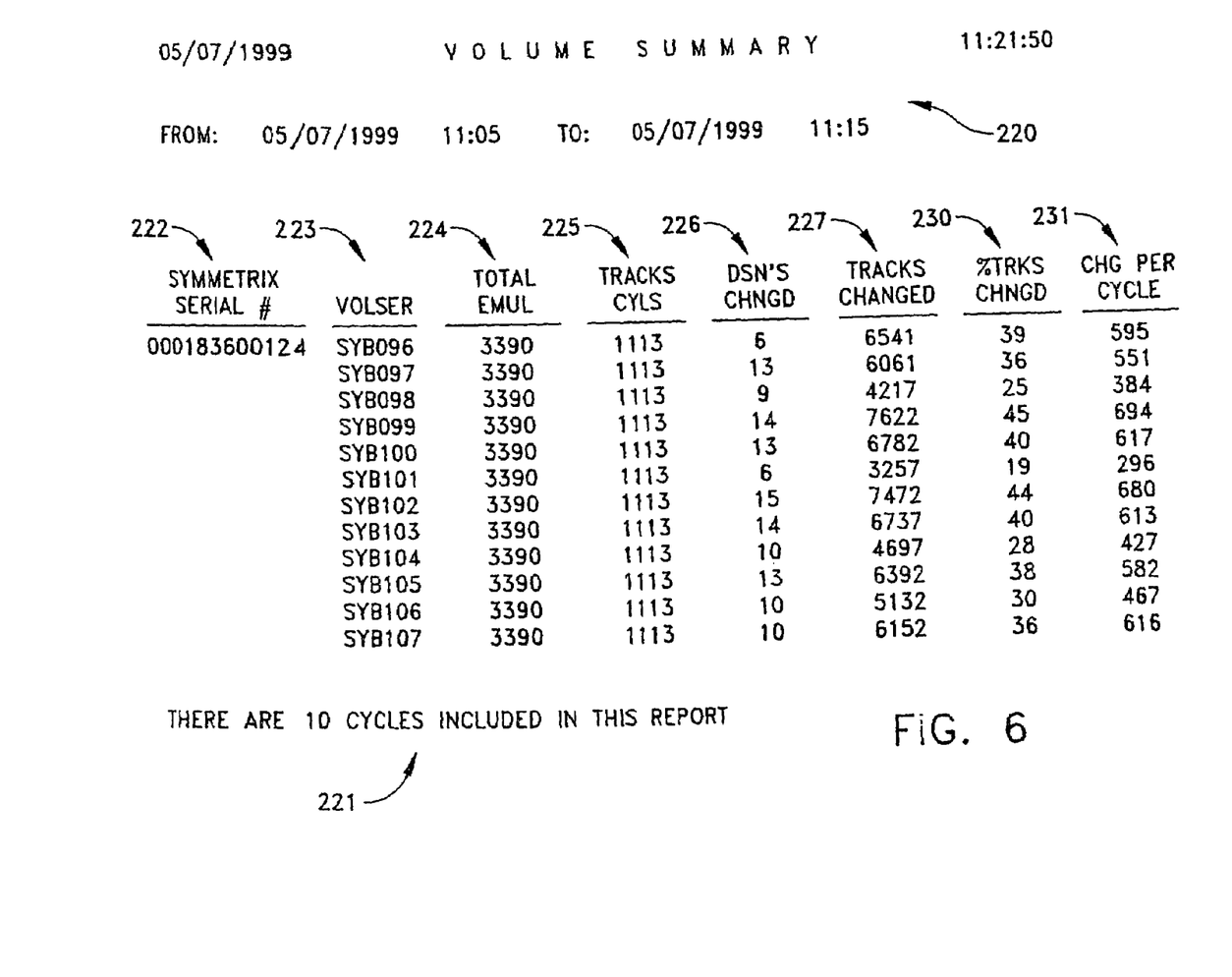
FIG. 6 depicts a second example of information provided by the collection and report processes.

If more volumes are included in the list, step 107 then diverts control back to step 104 to begin the process again. When all the volumes have been analyzed, step 107 diverts to step 108 that generates the report as shown in FIG. 6. Control then passes to step 96.

More specifically and in this particular embodiment, the report generated in step 108 includes a header 220 and trailer 221. Each line in the report provides information about a specific logical volume. Columns 222 and 223 define the selected devices by controller serial number and by a Volser number; Volser numbers are known in the art. Columns 224 and 225 depict the device type and number of cylinders. The report application calculates the total number of data sets within the volume for which tracks were changed and displays the result in column 226. More specifically, and by way of example, the report application finds what tracks have been allocated to a data set from a corresponding bit map. Then this bit map and the CHGTRK bit map are combined in a logical AND operation to identify the changed tracks. If the result of this operation is a "zero", no changes occurred. Conversely, if the result is greater than "zero", a change has occurred.

Columns 227, 230 and 231 display the total number of tracks changed in the volume, the percentage tracks that were changed during the report time frame and the average changes per cycle as determined by step 106. Step 107 returns control to step 104 if more volumes are to be processed. Otherwise, step 108 produces the report of FIG. 6.

If a logical volume is divided into data sets or files, the reporter application 52 in FIG. 1 can also provide a data set summary report. Step 96 in FIG. 4 transfers control to step 110 that selects a data set. Step 111 performs a logical OR operation for the entries for the volume for each cycle time in the report time frame. Then the system generates a mask for the data set and produces a logical AND operation with the data set mask and result of the logical OR operation. If more data sets are required, step 112 transfers control back to step 110.

When all the data sets have been analyzed, the application uses step 113 to generate a report, such as shown in FIG. 7 that depicts a report for two logical volumes with a header 232 that identifies each logical volume at 233 and the report time frame. A first column 234 in the report identifies each data set by name; a second column 235, a creation date for each data set. The report additionally shows the number of cylinders and extents for the data set in columns 236 and 237, respectively. Column 240 shows the number of tracks changed for each data set during the reporting time frame; column 241, the percentage of tracks on the data set that changed during the reporting time frame.

The volume and data set reports of FIGS. 6 and 7 do not provide information about a communication path, such as the communication path 36. However, this information, that is a by product of this invention, can provide a customer with important information about update activities at various granularities. For example, FIG. 7 depicts certain data sets that are very active and others that are inactive. The user might use this information to determine whether any relocation of files to a common area or, in the case of a logical volume extending over multiple physical drives to different physical drives, could improve performance.

In the form that is shown for this specifically disclosed embodiment, it will be apparent that this invention provides a method and means for obtaining information about the transfer of data over a communications path. Further, the invention allows this information to be obtained about a communications path that is geographically remote from a local production site such as the local production site 21 in FIG. 1. In fact, the remote communications path, such as the communications path 36, need not even exist to obtain this information, as all the information is derived based upon an analysis of write operations to the local memory such as the R1 device 26 shown in FIG. 1.

This invention has been disclosed in terms of a particular embodiment involving specific data configurations and processes for obtaining the desired information. Each of the steps in FIGS. 3 and 4 have been disclosed at a level that will allow a person of ordinary skill in the art to implement that step. It will also be apparent to persons of ordinary skill in the art that a variety of different approaches are available for implementing any step and that the specifically disclosed sequences could be altered without departing from the true spirit and scope of this invention. For example, FIG. 4 depicts a process by which the data is fully analyzed for a volume summary before the report is generated. The report could be generated on the fly in a real time basis. Other available parameters could be displayed; certain disclosed parameters might be omitted. Transfers of control from step 103 to step 95 and from step 108 to step 96 allow the selection of a combination of reports. Alternatively, these transfers could be eliminated to limit the selection to one report. Still other variations are possible. Therefore, it is the intent of the appended claims to cover all such variations and modifications as come within the true spirit and scope of this invention.

What is claimed as new and desired to be secured by Letters Patent of the United States is:

1. A program stored in a computer readable storage medium for obtaining information about the number of updates to data blocks in data block locations in a data storage facility over a time interval, said program comprising processes for providing:
    A) a definition of a data group set of at least one of the data blocks,
    B) a definition of an interval corresponding to the time period for which update information is desired,
    C) a recording, during the defined interval, of only a first update to each data block location for data in the data group set,
    D) a transfer to the data group set of the information obtained by said recording after the defined interval,
    E) a determination, from the information in the data group set, the total number of data block locations in the data group set that were updated at least one time during the defined interval, and
    F) a conversion of the total number of data block locations changed during the defined interval into bandwidth based information about all the updates during the defined interval.

2. A program as recited in claim 1 wherein said recording includes a definition of a flag for each data block and altering the state of each flag upon receiving a first update to a corresponding data block.

3. A program as recited in claim 2 wherein said recording additionally includes:
    i) an establishment of a first state for each flag at the beginning of the defined interval, and
    ii) establishment of a second state for an individual flag when the corresponding data block is updated a first time, said recording counting the total number of flags in the second state at the end of the defined interval.

4. A program as recited in claim 2 wherein said recording includes storing, in an other dataset, an identification of the time interval, data group and the defined flags.

5. A program as recited in claim 2 wherein the defined interval is divided into subintervals and said recording includes storing, for each data group in the data group set, the identifications of the subinterval and data group and the defined flags.

6. A program as recited in claim 5 wherein said recording includes:
    i) an establishment of a first state for each flag at the beginning of each sample subinterval, and
    ii) an establishment of a second state for an individual flag when the corresponding data block is updated for a first time, said recording counting the total number of flags in the second state at the end of the sample subinterval.

7. A program as recited in claim 1 wherein updates to the data storage facility are copied over a data communications path having predetermined characteristics to a data facility, said program additionally comprising a determination, from information obtained during said recording in combination with a first characteristic of the data communications path, of a second characteristic of the data communications path.

8. A program as recited in claim 7 wherein the data facility operates as a mirror for the data storage facility for maintaining a synchronized copy of the data therein and wherein said program obtains, as the first and seconds characteristics respectively, bandwidth and time for the mirror to achieve synchronism for the recorded update activity for that given bandwidth.

9. A program as recited in claim 7 wherein the data facility operates as a mirror for the data storage facility for maintaining a synchronized copy of the data therein and wherein said program determines as the first and second characteristics respectively, the time required for the mirror to achieve synchronism for the recorded update activity and the bandwidth required to achieve that resynchronization time.

10. A program stored in a computer readable storage medium for determining, from a local site with a local data storage facility, bandwidth related characteristics for a communications path that transfers data, produced by update operations, between first and second remote data storage facilities over a communications path wherein each of the data storage facilities stores data in datasets of defined data blocks, said program comprising processes for providing:
    A) a definition of a set of data blocks in the local site data storage facility,
    B) a definition of defining a time interval,
    C) a recording of an identification of each defined data block in the local data storage facility that is updated during the interval,
    D) a determination, upon completion of the time interval, of the number of data blocks in the defined data blocks that were updated during the time interval, and
    E) a conversion of the information based upon the number of data blocks that were changed during the defined time interval into bandwidth related properties of the communications path.

11. A program as recited in claim 10 wherein said recording includes:
    i) a definition of a table with a position corresponding to each of the defined data blocks and each position being set to a first state, and
    ii) a setting of a position corresponding to a defined data block during the defined time interval to a second state in response to a first update operation.

12. A program as recited in claim 11 wherein said recording occurs over a plurality of defined time intervals and said recording sets all the table positions to the first state at the beginning of each of the time intervals.

13. A program as recited in claim 12 additionally comprising a storage of the contents of the table after each of the time intervals with a date-time stamp corresponding to the interval.

14. A program as recited in claim 13 wherein said determination includes:
    i) a definition of a report to be generated including a time frame including at least one time interval for the report,
    ii) a processing of the stored contents of the table with date-time stamps within the time frame, and
    iii) a generation of a report with the numbers of track changes recorded in the processed contents.

15. A program as recited in claim 14 wherein the local disk storage facility includes a controller including a set of logical volumes and the defined data blocks include all the data blocks in the controller, said report definition including the generation of a corresponding reporter command, said processing including combining all the data block changes for the controller for all of the time intervals.

16. A program as recited in claim 15 wherein said processing includes the combination of the date-time stamped contents of each table in the report time frame in a logical OR operation to obtain a final table and the counting of the total number of positions in the final table set to the second state.

17. A program as recited in claim 16 additionally comprising the generation of the reporter command with one parameter specifying a resynchronization time in which corresponding updates should be completed between the first and second remote data storage facilities, said processing providing the required bandwidth of the communications path to provide that resynchronization time.

18. A program as recited in claim 17 wherein the communications path includes at least one path with a characteristic bandwidth, said program including a process for determining said bandwidth by dividing the required bandwidth by the number of paths to obtain the characteristic bandwidth.

19. A program as recited in claim 17 wherein the communications path will include at least one path with a characteristic bandwidth, said program including a process for determining the bandwidth by dividing the required bandwidth by the characteristic bandwidth to determine the number of required paths.

20. A program as recited in claim 16 additionally comprising the generation of the reporter command with one parameter specifying an available bandwidth of the communications path, said program including a process for providing a resynchronization time during which all updates to the first remote data storage facility will be transferred over the communications path to the second remote data storage facility.

21. A program as recited in claim 20 wherein the communications path includes at least one path having a characteristic bandwidth, said program providing the bandwidth as the mathematical product of the number of paths and the characteristic bandwidth.

22. A program as recited in claim 14 wherein the local data storage facility includes a plurality logical volumes and the defined data blocks include all the data blocks in the controller, said generation of the reporter command including the definition of a logical volume report for a set of at least one logical volume, said the combination of all the data block changes for each of the defined logical volumes.

23. A program as recited in claim 22 wherein said program includes the combination of all the contents of the table for a logical volume in a logical OR operation to obtain a final table and the summing of the positions in the final table that are set to the second state.

24. A program as recited in claim 16 wherein the local disk storage facility includes a plurality logical volumes and each logical volume includes at least one dataset, said generation of the reporter command defining a dataset report with a set of at least one dataset, said program including the combination of all the data block changes for each of the defined datasets.

25. A program as recited in claim 24 wherein said program additionally includes the definition of a mask of the data blocks forming the defined datasets, the generation of a final table that is the logical OR of all the tables in the logical volume containing the defined datasets and the combination of the mask and the final table in a logical AND operation.

26. A program stored in a computer readable storage medium for determining, from a local site with a local data storage facility, bandwidth related characteristics for a communications path that transfers data, produced by update operations, between first and second remote data storage facilities over a communications path wherein each of the data storage facilities stores data in datasets on defined disk tracks, said program comprising processes for providing:
   A) a definition of a set of disk tracks in the local site data storage facility,
   B) a definition of defining a time interval,
   C) a recording of an identification of each defined disk track in the local data storage facility that is updated during the interval,
   D) a determination, upon completion of the time interval, of the number of tracks in the defined set of disk tracks that were updated during the time interval, and
   E) a conversion of the information based upon the number of disk tracks that were changed during the defined time interval into bandwidth related properties of the communications path.

27. A program as recited in claim 26 wherein said recording includes:
   i) a definition of a table with a position corresponding to each of the defined disk tracks and each position being set to a first state, and
   ii) a setting of a position corresponding to a defined disk track during the defined time interval to a second state in response to a first update operation.

28. A program as recited in claim 27 wherein said recording occurs over a plurality of defined time intervals and said recording sets all the table positions to the first state at the beginning of each of the time intervals.

29. A program as recited in claim 28 additionally comprising a storage of the contents of the table after each of the time intervals with a date-time stamp corresponding to the interval.

30. A program as recited in claim 29 wherein said determination includes:
   i) a definition of a report to be generated including a time frame including at least one time interval for the report,
   ii) a processing of the stored contents of the table with date-time stamps within the time frame, and
   iii) a generation of a report with the numbers of track changes recorded in the processed contents.

31. A program as recited in claim 30 wherein the local disk storage facility includes a controller including a set of logical volumes and the defined disk tracks include all the disk tracks in the controller, said report definition including the generation of a corresponding reporter command, said processing including combining all the track changes for the controller for all of the time intervals.

32. A program as recited in claim 31 wherein said processing includes the combination of the date-time stamped contents of each table in the report time frame in a logical OR operation to obtain a final table and the counting of the total number of positions in the final table set to the second state.

33. A program as recited in claim 32 additionally comprising the generation of the reporter command with one parameter specifying a resynchronization time in which corresponding updates should be completed between the first and second remote data storage facilities, said processing providing the required bandwidth of the communications path to provide that resynchronization time.

34. A program as recited in claim 33 wherein the communications path includes at least one path with a characteristic bandwidth, said program including a process for determining said bandwidth by dividing the required bandwidth by the number of paths to obtain the characteristic bandwidth.

35. A program as recited in claim 33 wherein the communications path will include at least one path with a characteristic bandwidth, said program including a process for determining the bandwidth by dividing the required bandwidth by the characteristic bandwidth to determine the number of required paths.

36. A program as recited in claim 32 additionally comprising the generation of the reporter command with one parameter specifying an available bandwidth of the communications path, said program including a process for providing a resynchronization time during which all updates to the first remote data storage facility will be transferred over the communications path to the second remote data storage facility.

37. A program as recited in claim 36 wherein the communications path includes at least one path having a characteristic bandwidth, said program providing the bandwidth as the mathematical product of the number of paths and the characteristic bandwidth.

38. A program as recited in claim 30 wherein the local data storage facility includes a plurality logical volumes and the defined disk tracks include all the disk tracks in the controller, said generation of the reporter command including the definition of a logical volume report for a set of at least one logical volume, said the combination of all the track changes for each of the defined logical volumes.

39. A program as recited in claim 38 wherein said program includes the combination of all the contents of the table for a logical volume in a logical OR operation to obtain a final table and the summing of the positions in the final table that are set to the second state.

40. A program as recited in claim 32 wherein the local disk storage facility includes a plurality logical volumes and each logical volume includes at least one dataset, said generation of the reporter command defining a dataset report with a set of at least one dataset, said program including the combination of all the track changes for each of the defined datasets.

41. A program as recited in claim 40 wherein said program additionally includes the definition of a mask of the tracks forming the defined datasets, the generation of a final table that is the logical OR of all the tables in the logical volume containing the defined datasets and the combination of the mask and the final table in a logical AND operation.

* * * * *